(12) United States Patent
Mathews

(10) Patent No.: US 10,795,097 B2
(45) Date of Patent: Oct. 6, 2020

(54) CONNECTOR WITH LATCHING MECHANISM

(71) Applicant: 3M INNOVATIVE PROPERTIES COMPANY, St. Paul, MN (US)

(72) Inventor: Alexander R. Mathews, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/546,987

(22) Filed: Aug. 21, 2019

(65) Prior Publication Data

US 2019/0377140 A1  Dec. 12, 2019

Related U.S. Application Data

(63) Continuation of application No. 15/763,516, filed as application No. PCT/US2016/055126 on Oct. 3, 2016, now Pat. No. 10,416,395.

(Continued)

(51) Int. Cl.
| | |
|---|---|
| *H01R 24/84* | (2011.01) |
| *G02B 6/38* | (2006.01) |
| *H01R 13/28* | (2006.01) |
| *H01R 13/627* | (2006.01) |
| *H01R 13/633* | (2006.01) |
| *H01R 13/629* | (2006.01) |

(52) U.S. Cl.
CPC .......... *G02B 6/3898* (2013.01); *G02B 6/383* (2013.01); *H01R 13/28* (2013.01); *H01R 13/6273* (2013.01); *H01R 13/633* (2013.01); *H01R 24/84* (2013.01); *G02B 6/3893* (2013.01); *H01R 13/629* (2013.01); *H01R 13/6271* (2013.01); *H01R 13/6275* (2013.01)

(58) Field of Classification Search
CPC ...... H01R 23/27; H01R 24/84; H01R 13/629; H01R 13/6273; H01R 13/6275; H01R 13/6271
See application file for complete search history.

(56) References Cited

U.S. PATENT DOCUMENTS

| | | | |
|---|---|---|---|
| 3,467,942 A * | 9/1969 | Stoyer | H01R 13/432 439/293 |
| 4,431,244 A | 2/1984 | Anhalt | |

(Continued)

FOREIGN PATENT DOCUMENTS

| | | |
|---|---|---|
| WO | WO 2013-180646 | 12/2013 |
| WO | WO 2014-055226 | 4/2014 |

(Continued)

OTHER PUBLICATIONS

International Search Report for PCT International Application No. PCT/US2016/055126, dated Jan. 3, 2017, 4 pages.

*Primary Examiner* — Abdullah A Riyami
*Assistant Examiner* — Justin M Kratt
(74) *Attorney, Agent, or Firm* — Jonathan L. Tolstedt

(57) ABSTRACT

A hermaphroditic connector configured to mate with a mating hermaphroditic connector includes a latching mechanism configured to mechanically unlatch the connector and a mating connector. The latching mechanism of the connector, when actuated to unlatch the connector and the mating connector, disengages both a retention feature of the connector and a retention feature of the mating connector.

9 Claims, 19 Drawing Sheets

Related U.S. Application Data

(60) Provisional application No. 62/239,998, filed on Oct. 12, 2015.

(56) References Cited

U.S. PATENT DOCUMENTS

| | | | | |
|---|---|---|---|---|
| 5,425,650 | A * | 6/1995 | Maeda | H01R 13/631 439/374 |
| 6,030,244 | A | 2/2000 | Buckheit | |
| 9,146,366 | B2 | 9/2015 | Koutrokois | |
| 9,733,437 | B2 | 8/2017 | Droesbeke | |
| 2003/0129872 | A1* | 7/2003 | Tolmie | G02B 6/3817 439/577 |
| 2004/0156592 | A1 | 8/2004 | Cox | |
| 2014/0106601 | A1* | 4/2014 | Matsumoto | H01R 13/6271 439/352 |
| 2015/0167352 | A1 | 6/2015 | Xu | |

FOREIGN PATENT DOCUMENTS

| | | |
|---|---|---|
| WO | WO 2016-115002 | 7/2016 |
| WO | WO 2017-065999 | 4/2017 |
| WO | WO 2017-066018 | 4/2017 |
| WO | WO 2017-066019 | 4/2017 |
| WO | WO 2017-066037 | 4/2017 |
| WO | WO 2017-066135 | 4/2017 |
| WO | WO 2017-066137 | 4/2017 |
| WO | WO 2017-066138 | 4/2017 |

\* cited by examiner

CONNECTOR WITH LATCHING MECHANISM

TECHNICAL FIELD

This disclosure relates generally to latching connector assemblies and to associated systems and methods.

BACKGROUND

Connector assemblies include a pair of connectors, referred to as a connector and a mating connector, where the connector may include a connector housing and a plurality of components disposed within the connector housing and the mating connector includes a mating connector housing with a plurality of mating components disposed within the mating connector housing. The components of the connector are configured to couple with mating components of the mating connector, e.g., to make an electrical or optical connection. For example, in an electrical connector assembly, the components of the connector are electrical contacts that are configured to electrically couple to mating electrical contacts of the mating connector. In an optical connector, the components of the connector are optical elements or optical devices that are configured to optically couple to mating optical elements or devices of the mating connector.

Connector assemblies can be in-line connector assemblies wherein each connector of a connector pair is attached to and supported by a cable, e.g., a cable comprising one or more optical waveguides or a cable comprising one or more electrical wires, such that mating the connectors of the connector pair provides a cable-to-cable connection. In some configurations, one or both of the connector housings of a connector pair is attached to a backplane or other circuit on which electrical traces, optical waveguides, or fiber cables are routed. In this configuration, mating the connectors provides a board-to-cable or backplane to circuit board signal connection. In still other configurations, both connectors can be attached to circuit boards so that mating the connectors of the connector pair provides a board-to-board connection.

The connector and the mating connector of a connector pair may be assigned a "gender" and designated as "male" or "female." The "female" connector is generally a receptacle that receives and holds the "male" connector. Hermaphroditic connectors are those that have both male and female elements. In some hermaphroditic connector assemblies, the connector and the mating connector are identical.

BRIEF SUMMARY

Some embodiments involve a hermaphroditic connector configured to mate with a mating hermaphroditic connector. The connector includes a latching mechanism configured to mechanically unlatch the connector and the mating connector. The latching mechanism of the connector, when actuated to unlatch the connector and the mating connector, disengages both a retention feature of the connector and a retention feature of the mating connector.

Some embodiments are directed to a latching mechanism for a connector. A first retention feature is arranged at a first side of the connector and a second retention feature is arranged at a second side of the connector. A first disengagement feature is configured to disengage the second retention feature of the connector from a first retention feature of a mating connector. A second disengagement feature is configured to disengage a second retention feature of the mating connector from the first retention feature of the connector. An actuator mechanism is configured to cause movement of the first and second disengagement features to disengage the second retention features from the first retention features.

Some embodiments are directed to a connector having a latching mechanism. The latching mechanism includes a retention feature disposed on a first side of the connector and a complementary retention feature disposed on a second side of the connector opposite the first side. The retention feature of the connector is configured to engage a complementary retention feature of a mating connector and the complementary retention feature of the connector is configured to engage a retention feature of the mating connector. A first arm is disposed along the first side of the connector, the first arm having a first end and a second end and one or more cams disposed at the second end of the first arm. A linkage attaches the first end of the first arm to the second end of an actuating lever. A second arm is disposed along the second side of the connector, the second arm having a first end and a second end and at least one cam disposed at the second end of the second arm. A pivot arm is rigidly attached to the second end of the actuating lever and is attached to the first end of the second arm by a hinge. Actuation of the actuating lever causes rotation of the first end of the lever around the second end of the lever, the rotation of the first end of the lever causes the pivot arm to rotate around a fulcrum, rotation of the pivot arm around the fulcrum causes the first arm and the second arm to move in opposite directions along the first and second sides of the connector, respectively. Motion of the first arm causes the cams at the second end of the first arm to disengage the retention feature of the connector from the complementary retention feature of the mating connector. Motion of the second arm causes the cam at the second end of the second arm to disengage the complementary retention feature of the connector from the retention feature of the mating connector.

Some embodiments involve a method of unlatching a connector from a mating connector. An actuating lever coupled to a pivot arm and to first and second side arms is moved. A pivot arm is rotated in response to movement of the actuating lever. First and second side arms move translationally in opposite directions in response to rotation of the pivot arm. A second retention feature of the connector disengages from a first retention feature of a mating connector in response to movement of the second side arm. A second retention feature of the mating connector disengages from a first retention feature of the connector in response to movement of the first side arm.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments described herein involve latching mechanisms for connector assemblies. A latching mechanism operates to keep the connectors of a connector pair mechanically secured to prevent accidental decoupling of the components of the connector and the mating components of the mating connector. In some embodiments, connector assemblies include connectors that are hermaphroditic and each connector in a mating pair are identical. A latching mechanism according to embodiments disclosed herein can be operated to unlatch the connector from the mating connector from either end or either side of the connector assembly. The compact single-end latching mechanism disclosed herein can be used to provide a small footprint connector capable of mating, latching, unlatching, and de-mating from an identical mating connector. For example, the connector having a latching mechanism and/or alignment features as described herein can be mated and latched with an identical in-line connector to provide cable-to-cable connection, or can be mated and latched with a connector of a multi-module backplane or frontplane type carrier to provide a high signal density, high-signal count board-to-board interface.

Figure 1A:
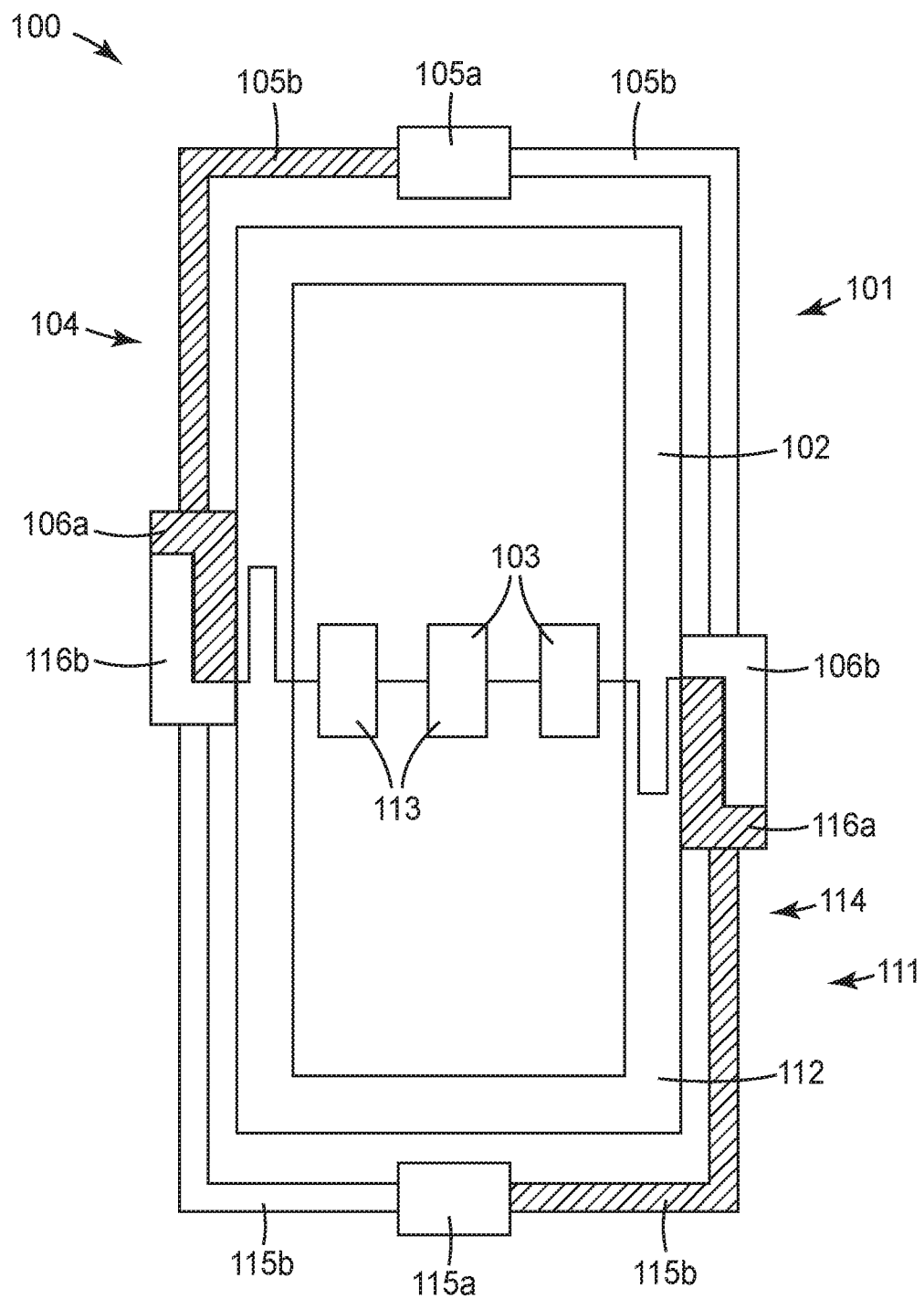
FIGS. 1A and 1B are cross sectional schematic diagrams of a connector assembly comprising a connector and a mating connector in accordance with some embodiments.
Figure 1B:
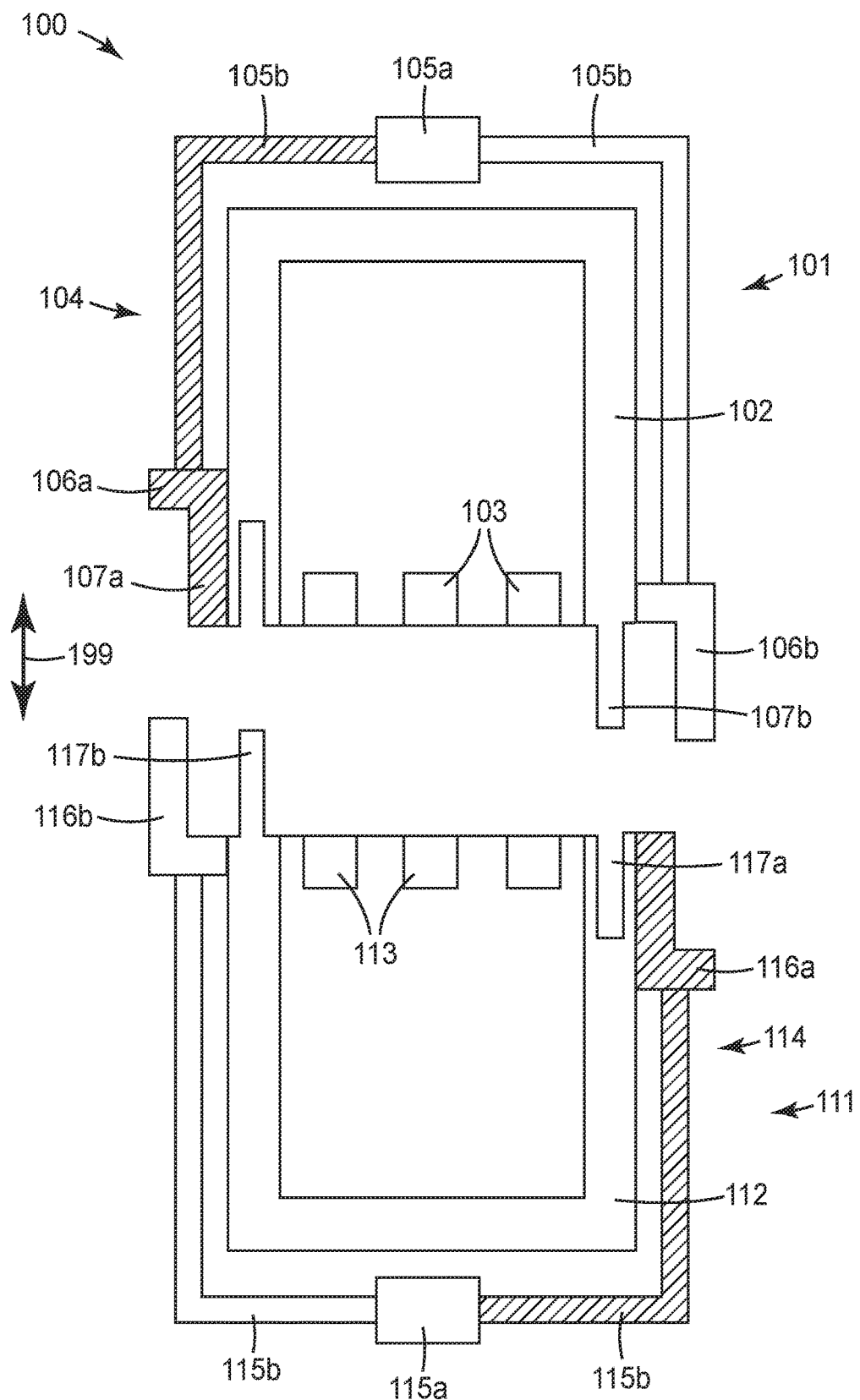

FIGS. 1A and 1B are cross sectional schematic diagrams of a connector assembly 100 comprising a connector 101 and a mating connector 111 in accordance with some embodiments. FIG. 1A shows the connector 101 and the mating connector 111 in the mated position and FIG. 1B shows the connector 101 and mating connector 111 in the unmated position. In the illustrated embodiment, the connector 101 and the mating connector 111 are identical and hermaphroditic, each having "male" and "female" features. The connector 101 includes a housing 102 and connector components 103, e.g., electrical contacts or optical elements, disposed within the housing 102. The mating connector 111 includes an identical housing 112 with connector components 113 disposed therein, the connector components 113 of the mating connector 111 are configured to couple with the connector components 103 of the connecter 101, e.g., to form an electrical or optical connection.

The connector 101 and the mating connector 111 may include complementary alignment features 107a, 107b, 117a, 117b configured to facilitate alignment of the connector 101 and the mating connector 111 during mating. The complementary alignment features 107a, 107b, 117a, 117b are configured to engage and align the housings 102, 112 and/or connector components 103, 113 of the connector 101 and the mating connector 111 as the connector 101 moves relative to the mating connector 111 along the mating axis 199.

The connector and mating connector 101, 111 each have a latching mechanism 104, 114 that includes an actuator mechanism 105a, 115a, a disengagement features 105b, 115b, and retention elements 106a, 106b, 116a, 116b. The retention elements 106a of the connector latching mechanism 104 are configured to mechanically engage and latch with complementary mating retention elements 116b of the latching mechanism 114 of the mating connector 111. The retention elements 106b are configured to mechanically engage and latch with complementary mating retention elements 116a of the mating connector 111.

The actuator mechanism 105a of the connector 101 can be operated by a human user to cause the disengagement feature 105b to disengage (unlatch) the retention element 106b of the connector 101 from the retention element 116a of the mating connector 111 and to disengage (unlatch) the retention element 116b of the mating connector 111 from the retention element 106a of the connector 101. The actuator mechanism 115a of the mating connector 111 can be operated by a human user to cause the disengagement feature 115b to disengage (unlatch) the retention element 116b of the mating connector 111 from the retention element 106a of the connector 101 and to disengage (unlatch) the retention element 106b of the connector 101 from the retention element 116a of the mating connector 111. Actuating either the actuator mechanism 105a of the connector 101 or the actuator mechanism 115a of the mating connector 111 unlatches the retention element 106b of the connector from the retention element 116a of the mating connector and unlatches the retention element 116b of the mating connector 111 from the retention element 106a of the connector 101. Thus, the connector 101 and the mating connector 111 can be disengaged by actuating only one of actuator mechanisms 105a, 115a and it is not necessary to actuate both actuator mechanisms 105a, 115a to unlatch the connector pair. Latching mechanisms that can be actuated from either connector of a connector pair is referred to herein as a "single-end-actuated" latching mechanism.

FIGS. 2A through 5C are diagrams of a connector assembly 200 comprising a connector 201 and a mating connector 211 that each have a single-end-actuated latching mechanism 204, 214. The exemplary connector assembly 200 shown in FIGS. 2A through 5C is illustrated as an optical connector assembly 200 which includes optical connector components e.g., optical ferrules also referred to as light coupling units, configured to optically couple with the mating optical connector components of the mating connector. It will be appreciated that illustrating the single-end-actuated latching mechanisms disclosed herein for an optical connector assembly is a matter of convenience and the single-end-actuating latching mechanisms could be utilized with any type of connector assembly, e.g., an electrical connector assembly, an opto-electronic connector assembly, and/or a connector assembly that includes both electrical and optical components and connects both electrical and optical paths.

Figure 2A:
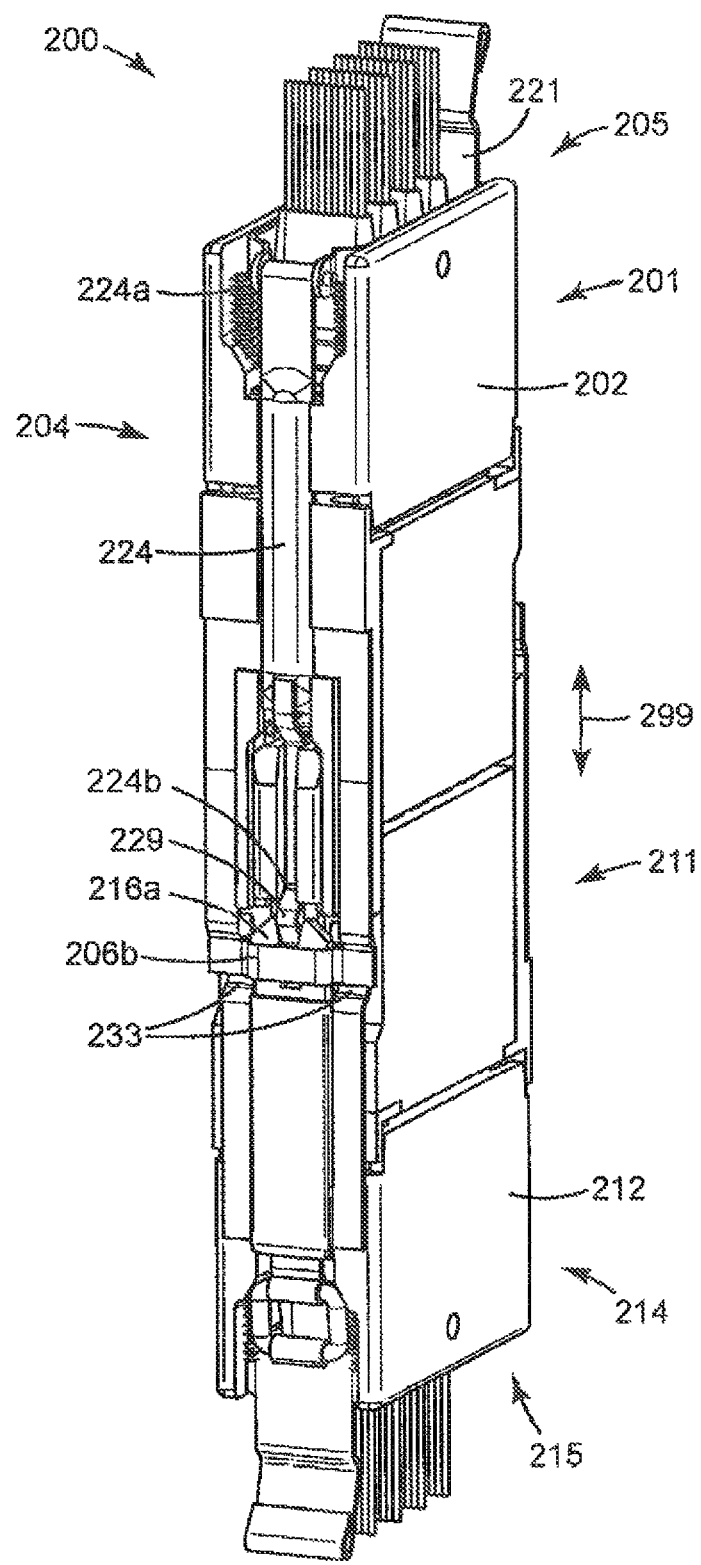
FIGS. 2A and 2B show left and right perspective views, respectively, of a connector assembly in the mated position.
Figure 2B:
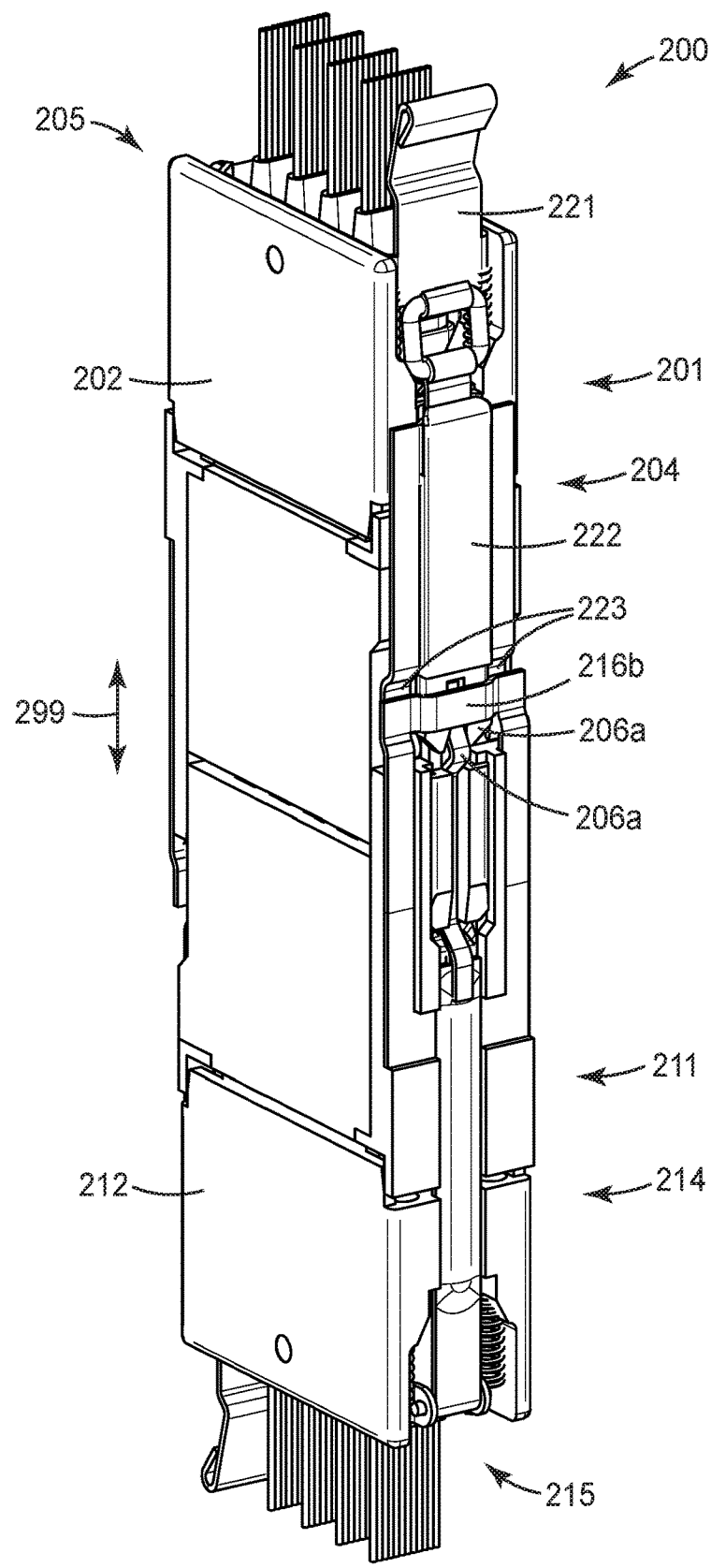
Figure 2C:
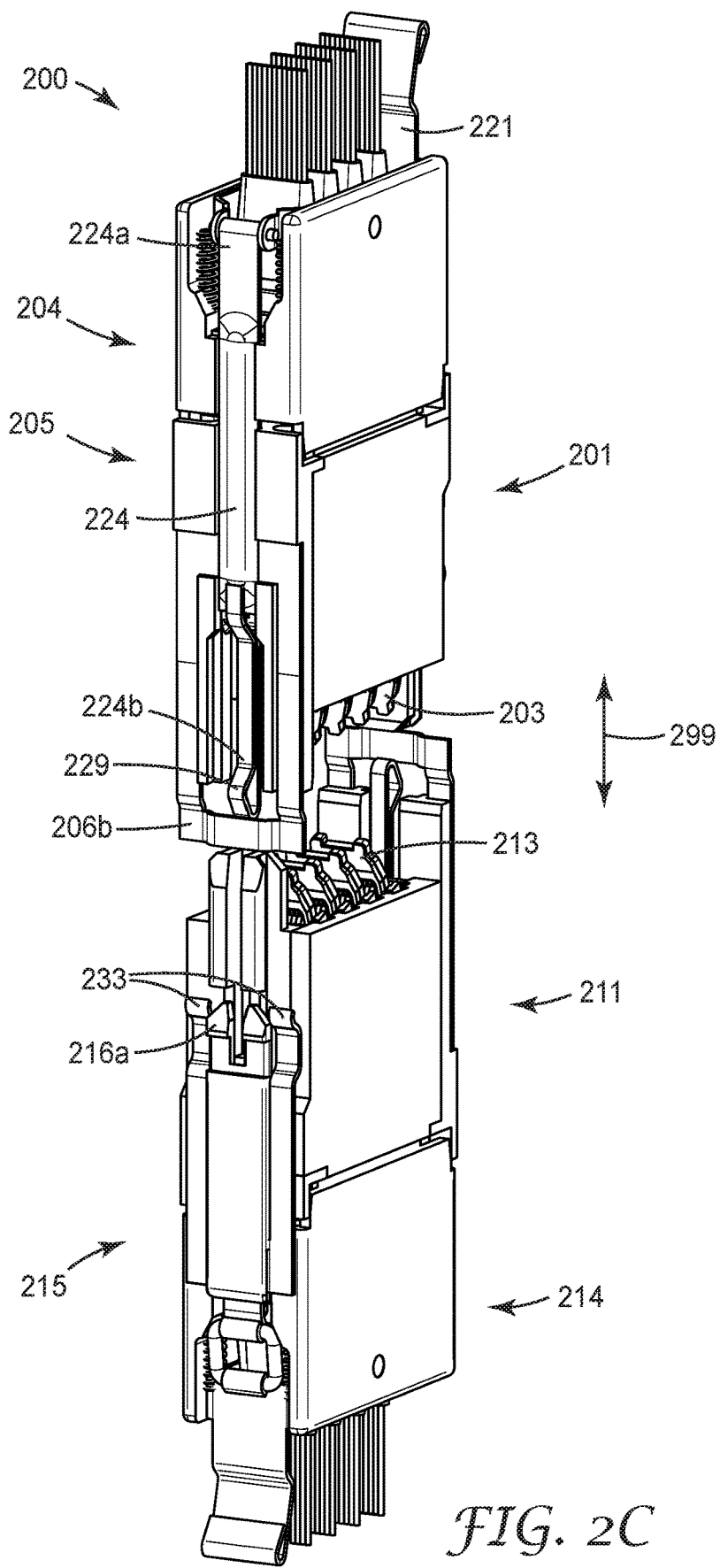
FIGS. 2C and 2D show left and right perspective views, respectively, of the connector assembly of FIGS. 2A and 2B in the unmated position.
Figure 2D:
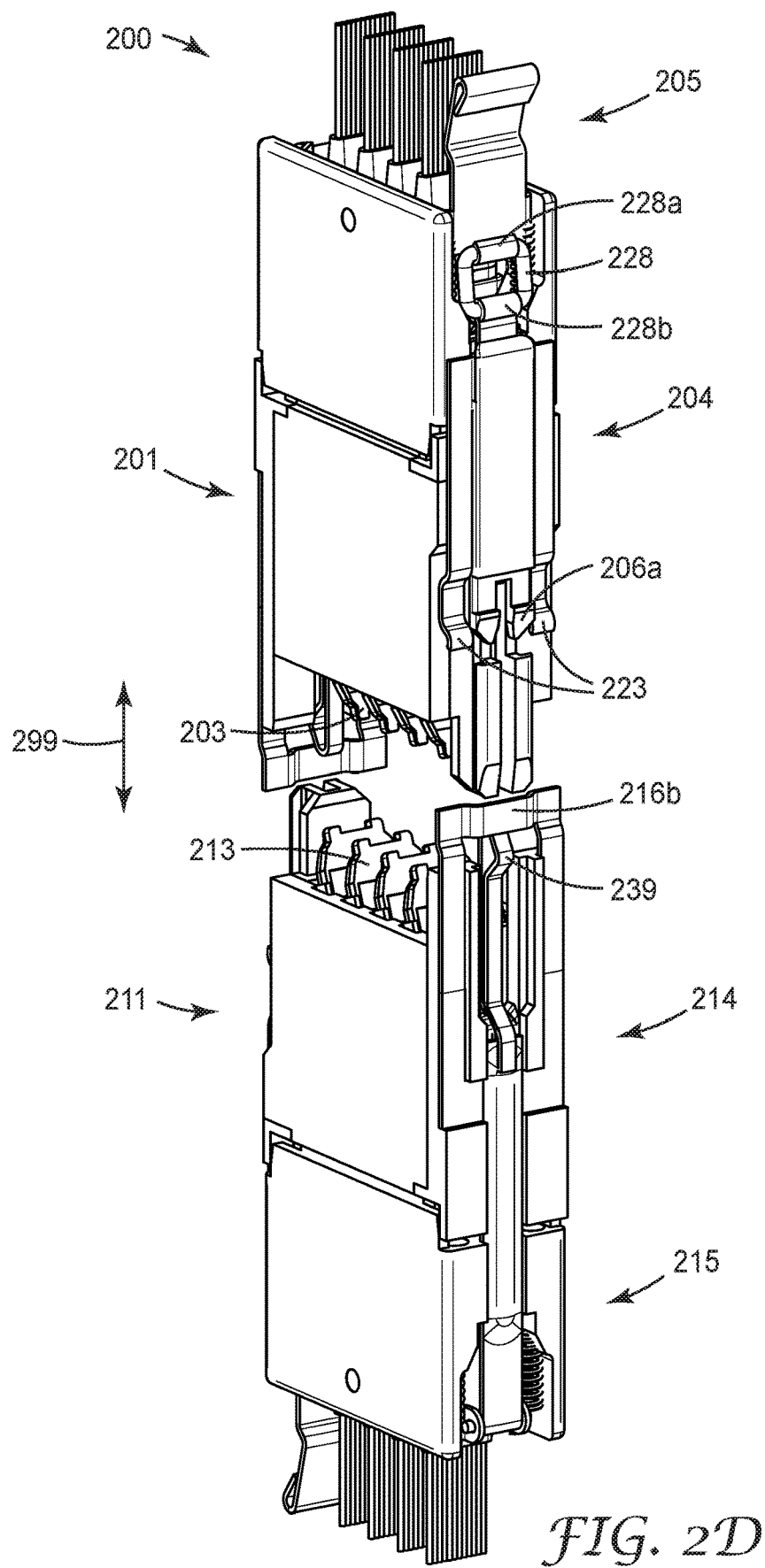

FIGS. 2A and 2B show left and right perspective views, respectively, of the connector assembly 200 in the mated position. FIGS. 2C and 2D show left and right perspective views, respectively, of the connector assembly 200 in the unmated position. During mating, the connector 201 moves relative to the mating connector 211 along the mating axis 299. In this embodiment, the connector 201 and the mating connector 211 are identical and hermaphroditic, each having "male" and "female" elements. The connector 201 includes a housing 202 and optical ferrules 203 (also referred to as "light coupling units") disposed within the housing 202. The mating connector 211 includes a housing 212 with optical ferrules 213 disposed within housing 212. The optical ferrules 203 of connector 201 are configured to optically couple with the optical ferrules 213 of the mating connector 211 when the connectors 201, 211 are mated.

The connector 201 has a latching mechanism 204 that includes an actuator mechanism 205, disengagement features 223, 229, and retention elements 206a, 206b. In the illustrated embodiment, the actuator mechanism 205 comprises an actuating lever 221, side arms 222, 224, pivot arm 225, fulcrum 226, linkage 228, and hinged joint 227 as shown in FIGS. 3A through 5C. The mating connector 211 has a latching mechanism 214 that includes an actuator mechanism 215, disengagement features 233, 239 and retention elements 216a, 216b. When the connector pair 200 is mated, the retention element 206a of the connector latching mechanism 204 mechanically engages and latches with a complementary mating retention element 216b of the latching mechanism 214 of the mating connector 211. The retention element 216a of the connector latching mechanism 214 is configured to mechanically engage and latch with complementary mating retention element 206b of the latching mechanism 204 of the connector 201.

In the illustrated example, the retention elements 206a, 216a are dual catches and the retention elements 206b, 216b are latches. When actuated by operation of the actuator mechanism 205, the disengagement feature 229 of the connector 201 is configured to disengage (unlatch) the latch 206b of the connector 201 from the mating catches 216a of the mating connector 211 and disengagement feature 223 is configured to unlatch the latch 216b of the mating connector 211 from the catches 206a of the connector 201. When actuated by operation of the actuator mechanism 215, the disengagement feature 239 of the mating connector 211 is configured to unlatch the latch 216b of the mating connector 211 from the catches 206a of connector 201 and disengagement feature 233 is configured to unlatch the latch 206b of the connector 201 from the catches 216a of the mating connector 211. Operating either the actuator mechanism 205 of the connector 201 or the actuator mechanism 215 of the mating connector 211 unlatches both the latch 206b of the connector and the latch 216b of the mating connector 211. Thus, the connector 201 and the mating connector 211 can be unlatched by operating only one of actuator mechanisms 205, 215 and it is not necessary to operate both actuator mechanisms 205, 215 to unlatch the retention elements 206a, 206b, 216a, 216b. Each of the connectors 201, 211 of connector assembly 200 includes a single-end-actuated latching mechanism and the connector and the mating connector of the connector pair can be unlatched from either end of the connector assembly by operating one of the actuator mechanisms 205, 215. Operating both the actuator mechanism 205 of the connector 201 and the actuator mechanism 215 of the mating connector 211 is not needed to unlatch the connector pair 200.

Figure 3A:
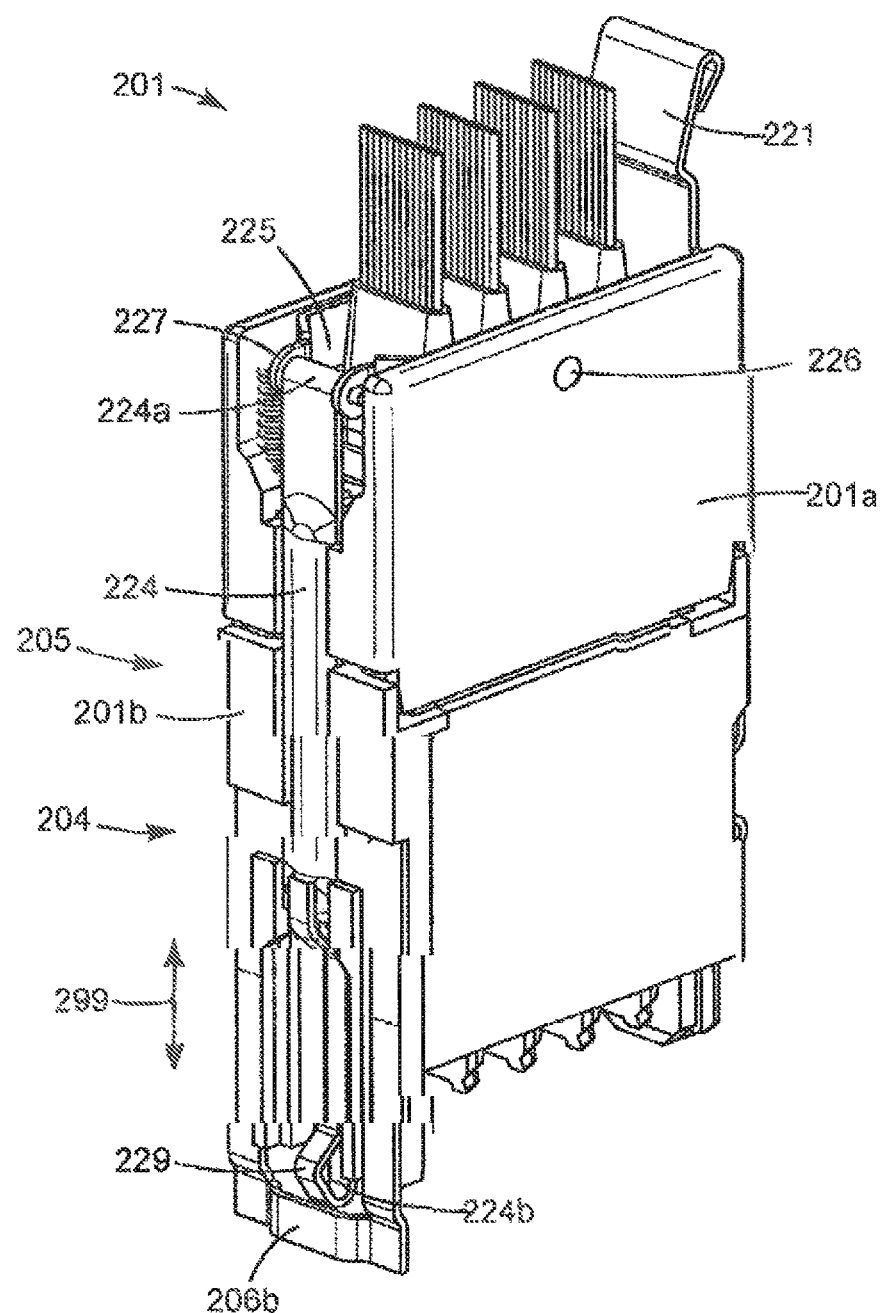
FIGS. 3A and 3B illustrate left side and right side perspective views, respectively, of optical connector having a latching mechanism in the neutral position (not in the process of being unlatched) in accordance with some embodiments.
Figure 3B:
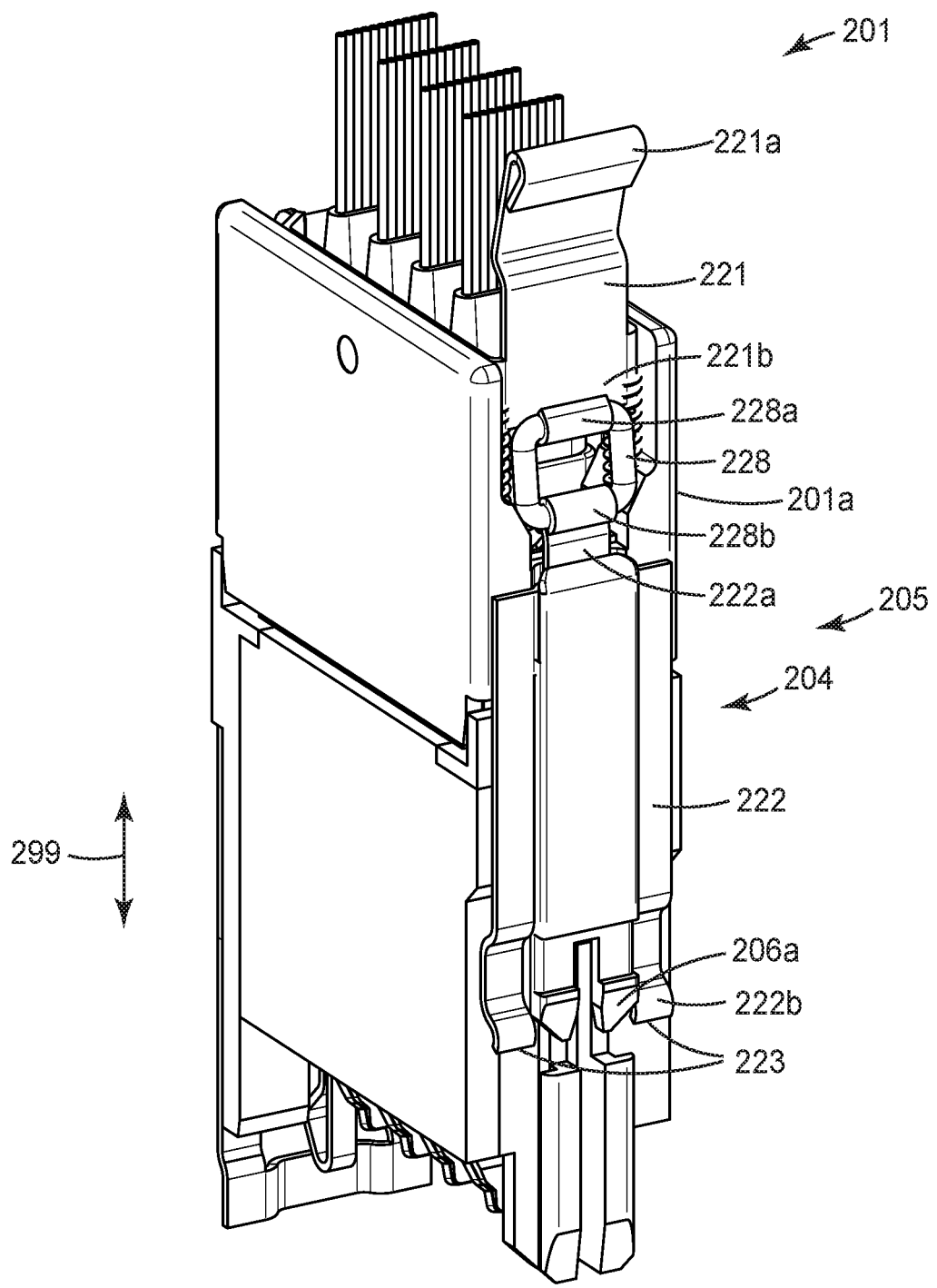

FIGS. 3A through 5C show in more detail components of the actuator mechanism 205 and the disengagement features 223, 229 and illustrate the unlatching operation of the single-end-actuated latching mechanism 204. FIGS. 3A and 3B illustrate left side and right side perspective views, respectively, of optical connector 201 having a latching mechanism 204 in the neutral position (not in the process of being unlatched). The latching mechanism 204 includes a first retention feature 206a (e.g., dual catches) disposed on a first side 201a of the connector 201 and a second retention feature 206b (e.g., a latch) disposed on a second side 201b of the connector 201 opposite the first side 201a.

The actuator mechanism 205 includes an actuating lever 221 having a first end 221a and a second end 221b. A first side arm 222 is disposed along the first side 201a of the housing 201. The first side arm has a first end 222a and a second end 222b. A linkage 228 connects the second end 221b of the actuating lever 221 to the first end 222a of the first side arms. The linkage 228 may comprise a first hinge joint 228a attached to the lever 221 and a second hinge joint 228b attached to the first end 222a of the first side arm 222. Alternatively, the linkage 228 may comprise a first hinge joint attached to the lever and a bendable blade attached to the first end of the first side arm.

First disengagement features, e.g., one or more cams 223, are disposed at the second end 222b of the first side arm 222. In some embodiments, the first side arm 222 comprises two sub-arms that extend on either side of the catches 206a, and a cam 223 is disposed at the second end of each of the sub-arms. The actuator mechanism 205 includes a second side arm 224 disposed along the second side 201b of the housing 201. The second side arm 224 has a first end 224a and a second end 224b. A second disengagement feature, e.g., a cam 229, is disposed at the second end 224b of the second side arm 224. The actuator mechanism 205 includes a pivot arm 225 that pivots about a fulcrum 226 which is rigidly attached to the second end 221b of the actuating lever 221 and is attached to the first end 224a of the second arm 224 by a hinged joint 227.

Figure 4A:
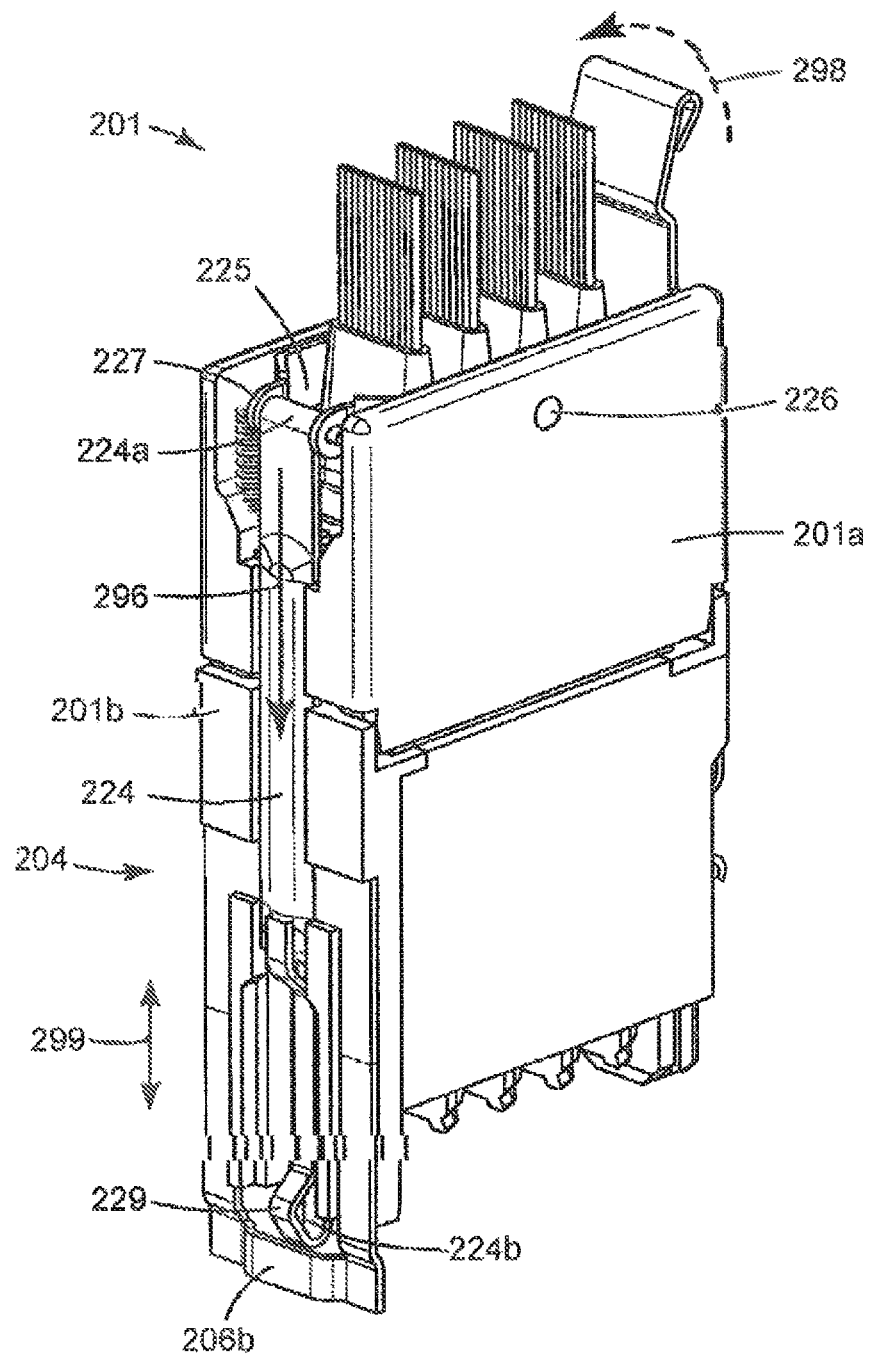
FIGS. 4A and 4B show the latching mechanism of FIGS. 2A through 2B in a partially released latch position in accordance with some embodiments.
Figure 4B:
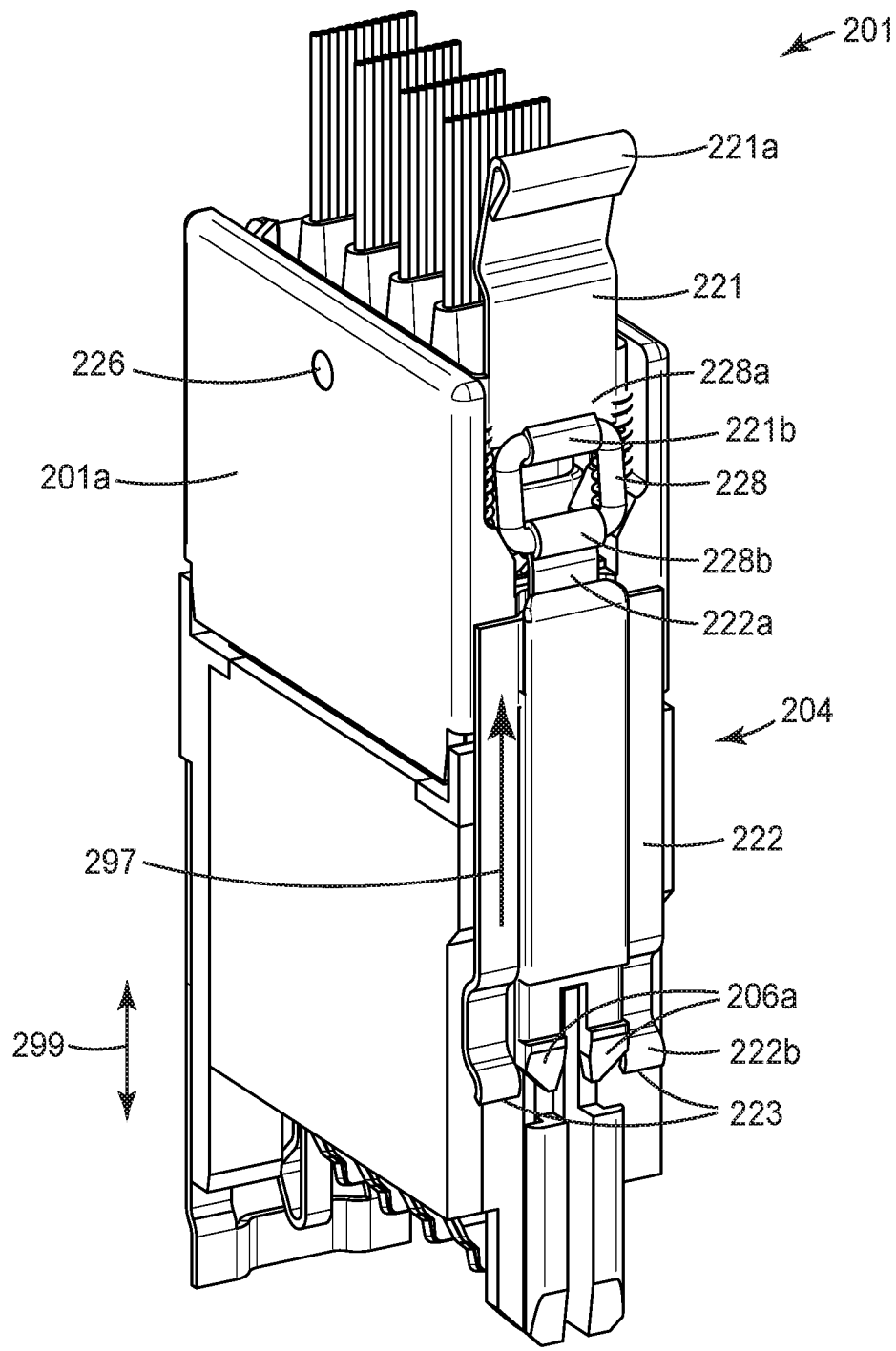
Figure 5A:
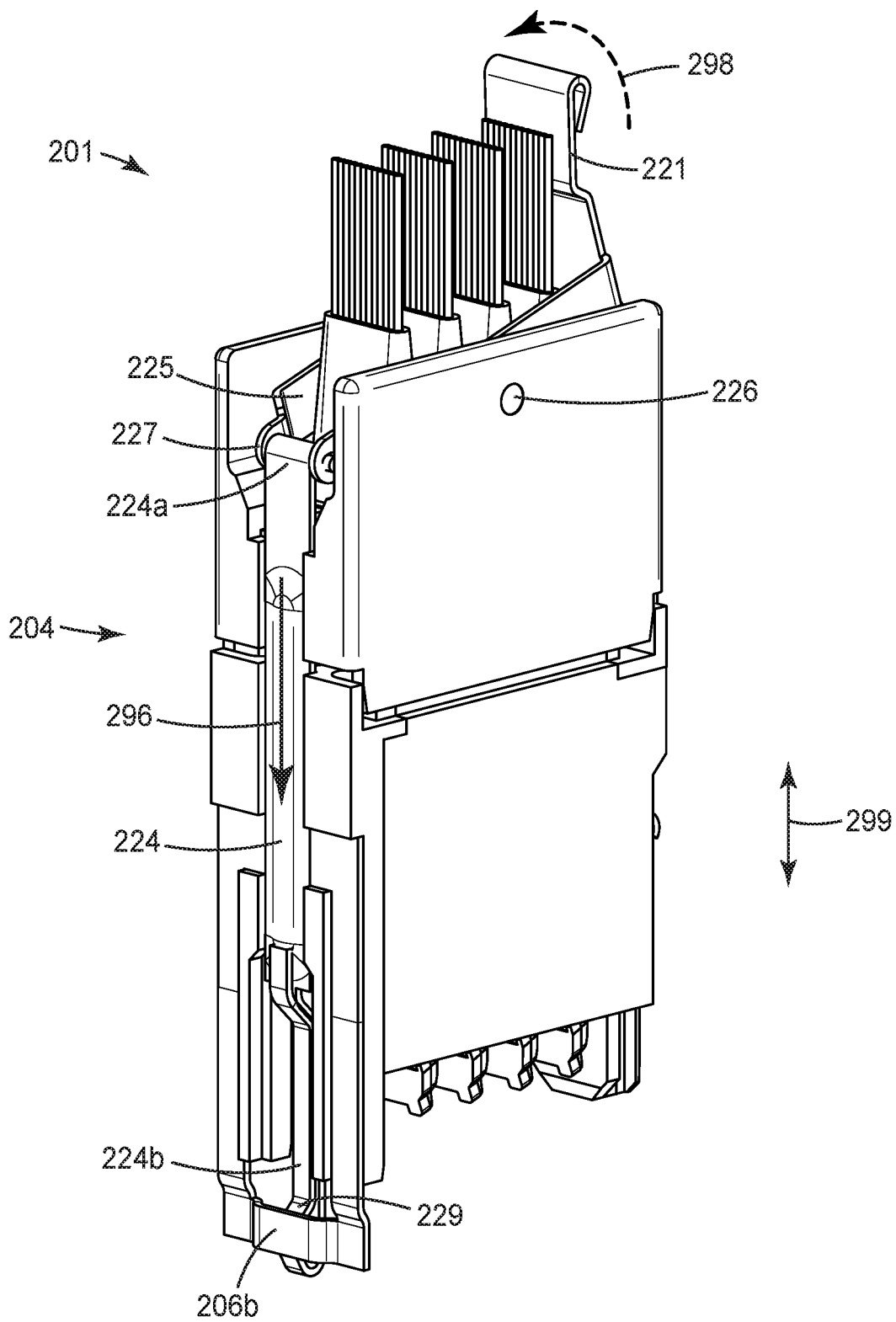
FIGS. 5A and 5B show the latching mechanism of FIGS. 2A and 2B in a fully released latch position in accordance with some embodiments.
Figure 5B:
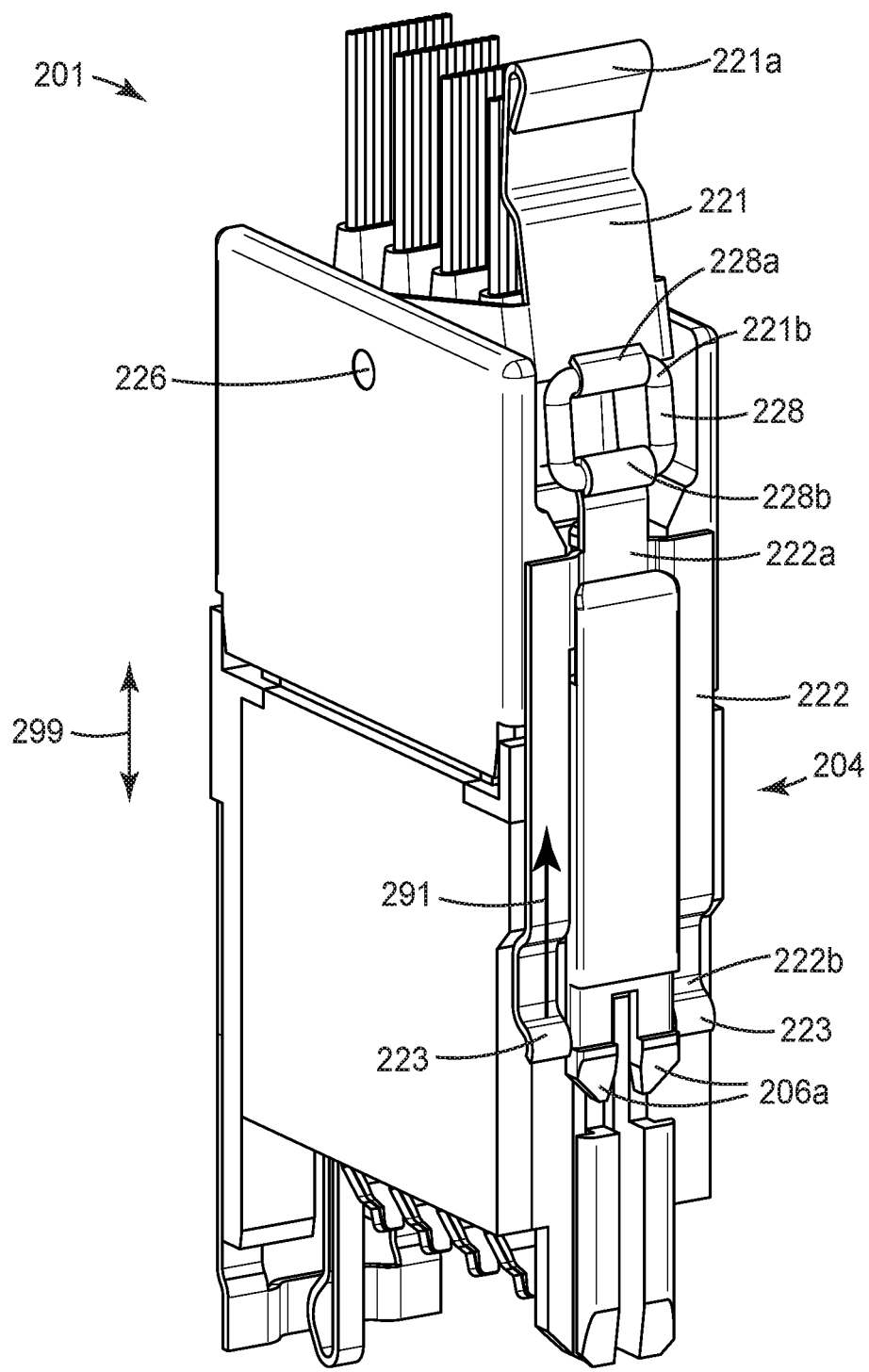
Figure 5C:
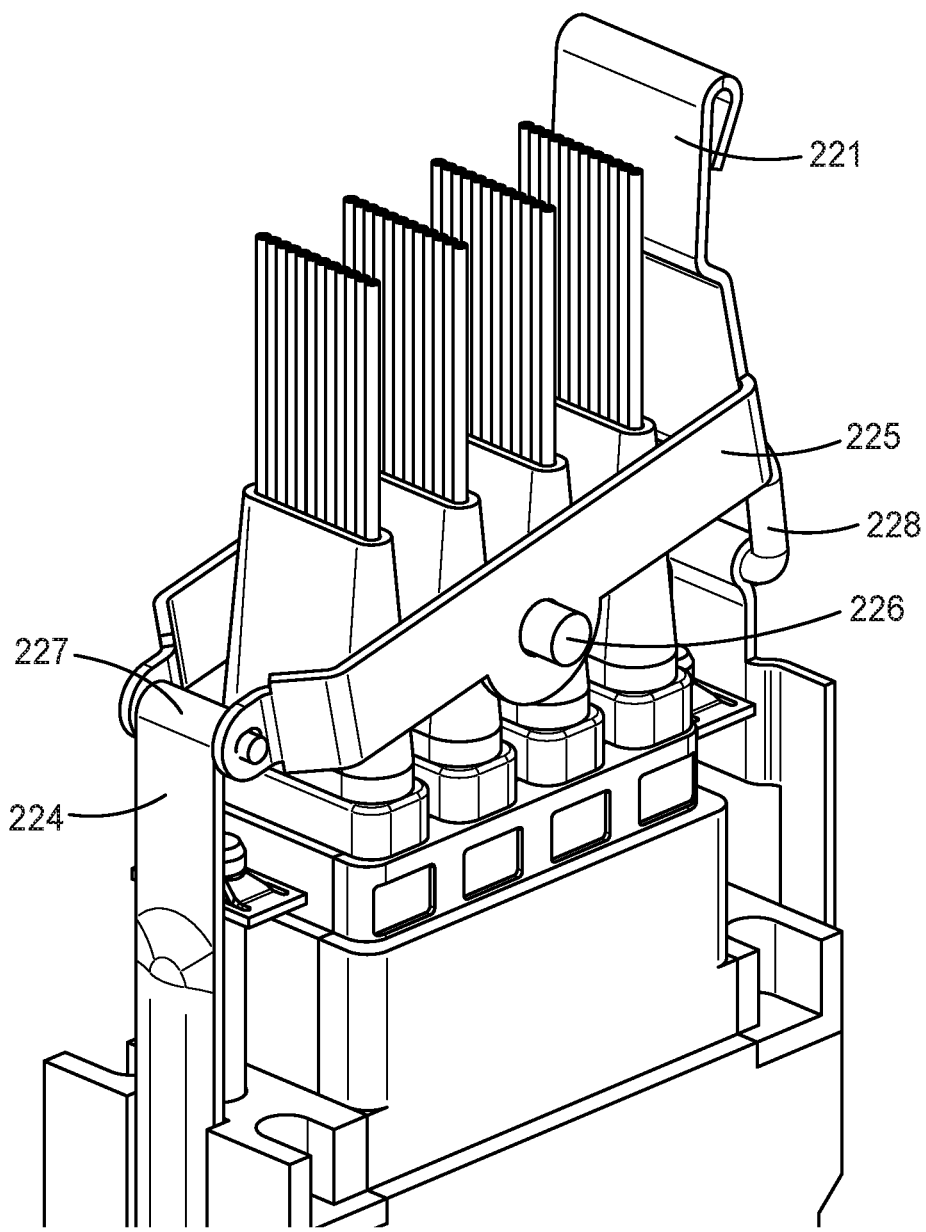
FIG. 5C provides a detailed view of the rotation of the pivot arm of the latching mechanism around the fulcrum due to operation of the actuating lever.

FIGS. 4A through 5C illustrate in more detail the unlatching operation. FIGS. 4A and 4B show the latching mechanism 204 in a partially released latch position. FIGS. 5A and 5B show the latching mechanism 204 in a fully released latch position. The latching mechanism 204 is operated to unlatch the connector 201 from a mating connector (not shown in FIGS. 4A through 5C but shown in FIGS. 2A through 2D) by applying a force to the actuating lever 221. Actuation of the actuating lever 221 rotates the actuating lever 221 around the lever's second end 221b which is connected to the first side arm 222 as indicated by arrow 298. The second end 221b of the lever 221 is rigidly attached to the pivot arm 225 and rotation of the lever 221 causes rotation of the pivot arm 225 around the fulcrum 226. FIG. 5C provides a detailed view of the rotation of the pivot arm 225 around the fulcrum 226 due to operation of the actuating lever 221. Rotation of the pivot arm 225 around the fulcrum 226 causes the first side arm 222 and the second side arm 224 to move in opposite directions along the mating axis 299. During unlatching, the first side arm 222 moves in the direction indicated by arrow 297. The second side arm 224 moves in the direction indicated by arrow 296. Motion of the first side arm 222 causes the cams 223 at the second end 222b of the first side arm 222 to move the latch 216b of the mating connector 211 (see FIGS. 2B and 2D) away from the first side 201a of the connector housing 201 along an axis perpendicular to the mating axis 299. The movement of the mating connector latch 216b disengages the latch 216b from the catches 206b.

The opposite motion of the second side arm 224, indicated by arrow 296, causes the cam 229 disposed at the second end 224b of the second side arm 224 to slide under the latch 206b, moving the latch 206b away from the second side 201b of the connector housing 201 along an axis perpendicular to the mating axis 299. Movement of the connector latch 206b disengages the latch 206b from the catches 216a of the mating connector 211 (not shown in FIG. 4A, but shown in FIGS. 2A and 2C).

The components of the latching mechanism described herein may be made of any suitable material, e.g., metal, plastic, etc. Portions of the latching mechanism that are stationary may be molded as part of the connector housing. For example, in some implementations, the lever, pivot arm, fulcrum, side arms, latches, and cams are made of metal and the catches are a molded part of the connector housing.

In some embodiments, in addition to the latching mechanisms described above, the connector may include alignment features configured to align the connector with the mating connector to facilitate proper alignment of connector components, e.g., optical elements, electrical contacts, optoelectronic devices, etc., when the connector is mated with a mating connector. FIGS. 6 through 9D show examples of connector alignment features that can be implemented in conjunction with the latching mechanisms described herein. It will be appreciated that FIGS. 6 through 9D illustrate a representative, non-limiting set of alignment features and that many other types of alignment features could alternatively or additionally be used with the disclosed latching mechanisms. The alignment features shown in FIGS. 6 through 8D may be used with the disclosed latching mechanisms, however in FIGS. 6 through 8D, the latching mechanisms are not shown so that the alignment features are visible.

Figure 6:
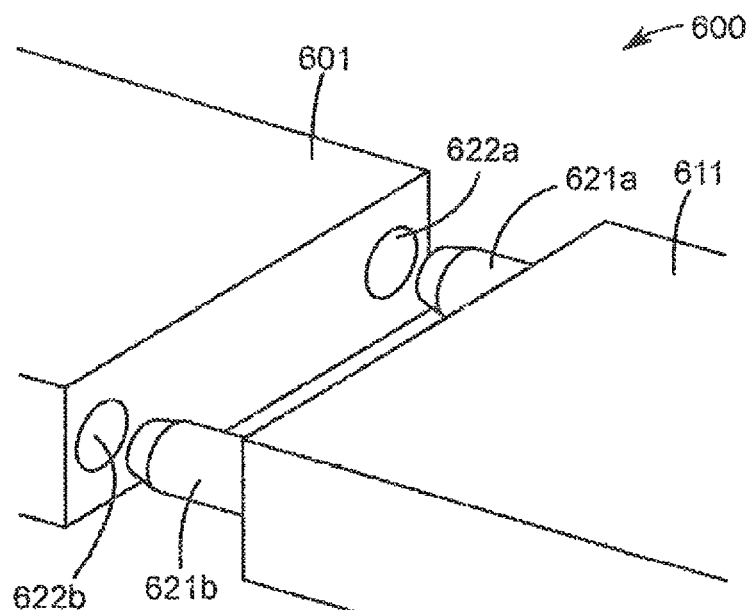
FIG. 6 illustrates alignment of a connector and a mating connector that is achieved using pins and sockets, the alignment features of FIG. 6 being suitable for use in conjunction with a latching mechanism as shown in FIGS. 2A and 2B in accordance with some embodiments.

As illustrated in FIG. 6, alignment between an electrical or optical coupling device 601 and a mating electrical or optical coupling device 611 of a connector assembly 600 may be achieved using pins 621a, 621b and sockets 622a, 622b, e.g., round pins and round sockets. In these implementations, precise location of pins 621a, 621b and sockets 622a, 622b prevents binding during mating. For example, the optical coupling device may comprise an electrical and/or optical ferrule or an electrical and/or optical connector.

When round pins and sockets are used, there is a tradeoff between sufficient clearance between pins and sockets to provide smooth mating and positioning error. If clearance between pins and sockets is relatively large, mating is smooth but alignment of connector components may be less precise. In contrast, when clearance between pins and sockets is relatively small, alignment is more precise, but the pins and sockets may bind during mating.

Figure 7:
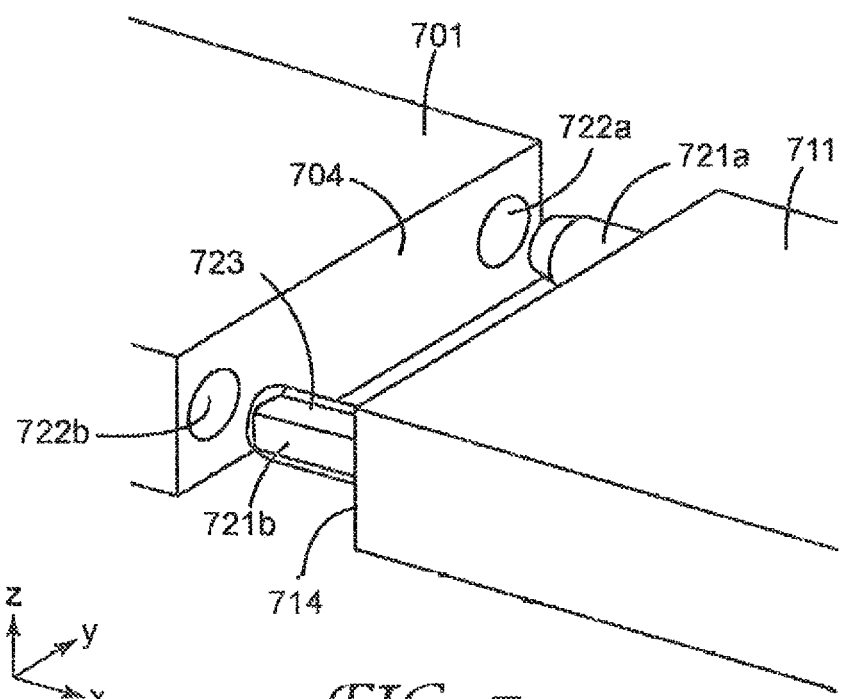
FIG. 7 shows alignment between electrical or optical coupling devices which includes pins and a mating connector which includes sockets where at least one of the pins include one or more flats, the alignment features of FIG. 7 being suitable for use in conjunction with a latching mechanism as shown in FIGS. 2A and 2B in accordance with some embodiments.

In some embodiments, shown in FIG. 7, using a pin that has flats or other relief features along at least a portion of the length of the pin (along the x axis indicated in FIG. 7) relaxes the clearance needed to achieve both smooth mating and precise alignment. FIG. 7 shows the alignment between connector 701 which includes sockets 722a, 722b and mating connector 711 which includes pins 721a, 721b. Pin 721b has one or more flats 723. When inserted into the socked 722a, the round pin 721a can control four degrees of freedom of the connector (translation along the y axis, translation along the z axis, rotation around the y axis (pitch), rotation around the z axis (yaw). The relieved pin 721b controls a fifth degree of freedom (rotation around the x axis (roll). The sixth and final degree (translation along the x axis) is controlled by the final mating faces 704, 714 of the connectors 701, 711.

FIGS. 6 and 7 illustrate connector pairs having male and female connectors. It will be appreciated that in alternative embodiments, the alignment features illustrated in FIGS. 6 and 7 may be arranged so that both the connector and the mating connector are hermaphroditic and have both male and female features.

Figure 8A:
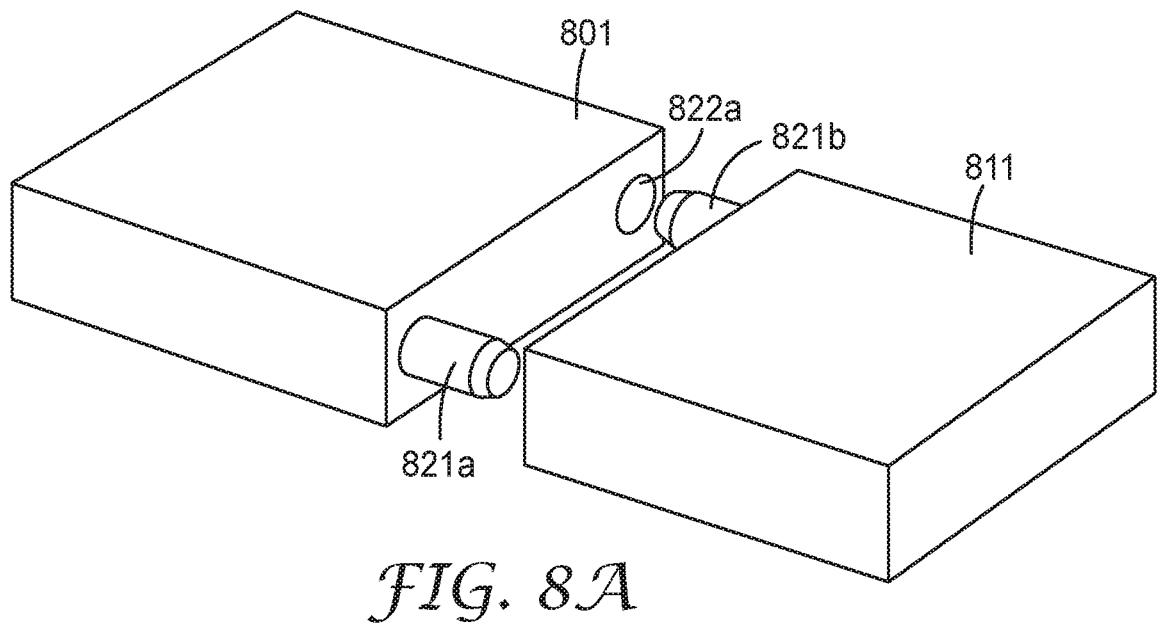
FIGS. 8A and 8B illustrate alignment between electrical or optical coupling devices which are hermaphroditic, the alignment features of FIGS. 8A and 8B being suitable for use in conjunction with a latching mechanism as shown in FIGS. 2A and 2B in accordance with some embodiments.
Figure 8B:
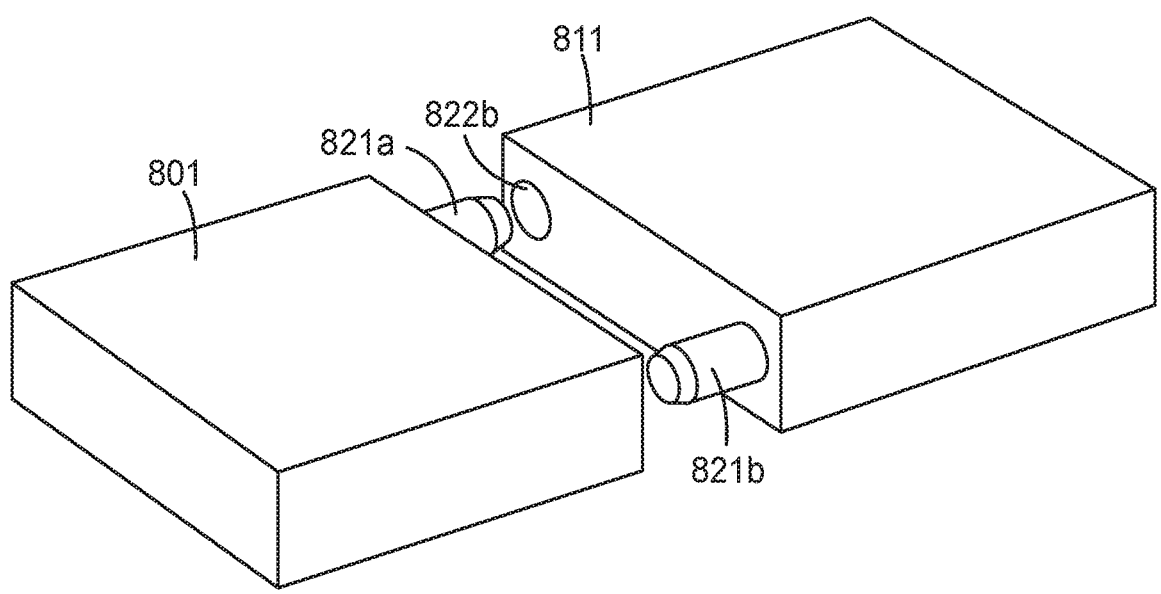

FIGS. 8A and 8B are top and bottom views of an electrical or optical coupling device 801 and a mating electrical or optical coupling device 811 wherein the devices 801, 811 are hermaphroditic. The alignment features of FIGS. 8A and 8B are suitable for use in conjunction with a latching mechanism shown in FIGS. 2A and 2B. As illustrated in FIGS. 8A and 8B, each coupling device 801, 811 includes both male and female alignment components. Coupling device 801 includes pin 821a that engages with socket 822b of coupling device 811. Coupling device 801 also includes socket 822a that engages with pin 821b of coupling device 811.

FIGS. 9A through 9D provide another example of hermaphroditic alignment features suitable for use in conjunction with a latching mechanism as previously discussed. In this example, connector assembly 900 includes connector 901 and an identical mating connector 911 which in this example are optical connectors. The connectors 901, 911 include a housing 902, 912 with optical ferrules 903, 913 arranged therein. Connector 901 includes an alignment features 921a, 921b. In this example, alignment feature 921a is a t-post which in cross section approximates the shape of a "T" and alignment feature 921b is a t-slot 921b which is dimensioned to receive the t-post 922a of the mating connector 911. Mating connector 911 includes an alignment feature comprising t-post 922a and an alignment feature comprising t-slot 922b which is dimensioned to receive the t-post 921a of the mating connector. In this embodiment, the alignment features 921a, 921b of connector 901 are part of the housing 902 and the alignment features 922a, 922b of connector 911 are part of the housing 912. The t-posts and t-slots described in this example can be used to provide a reduced footprint of the connector and the mating connector, e.g., when compared to the round pins and sockets previously discussed.

Figure 9A:
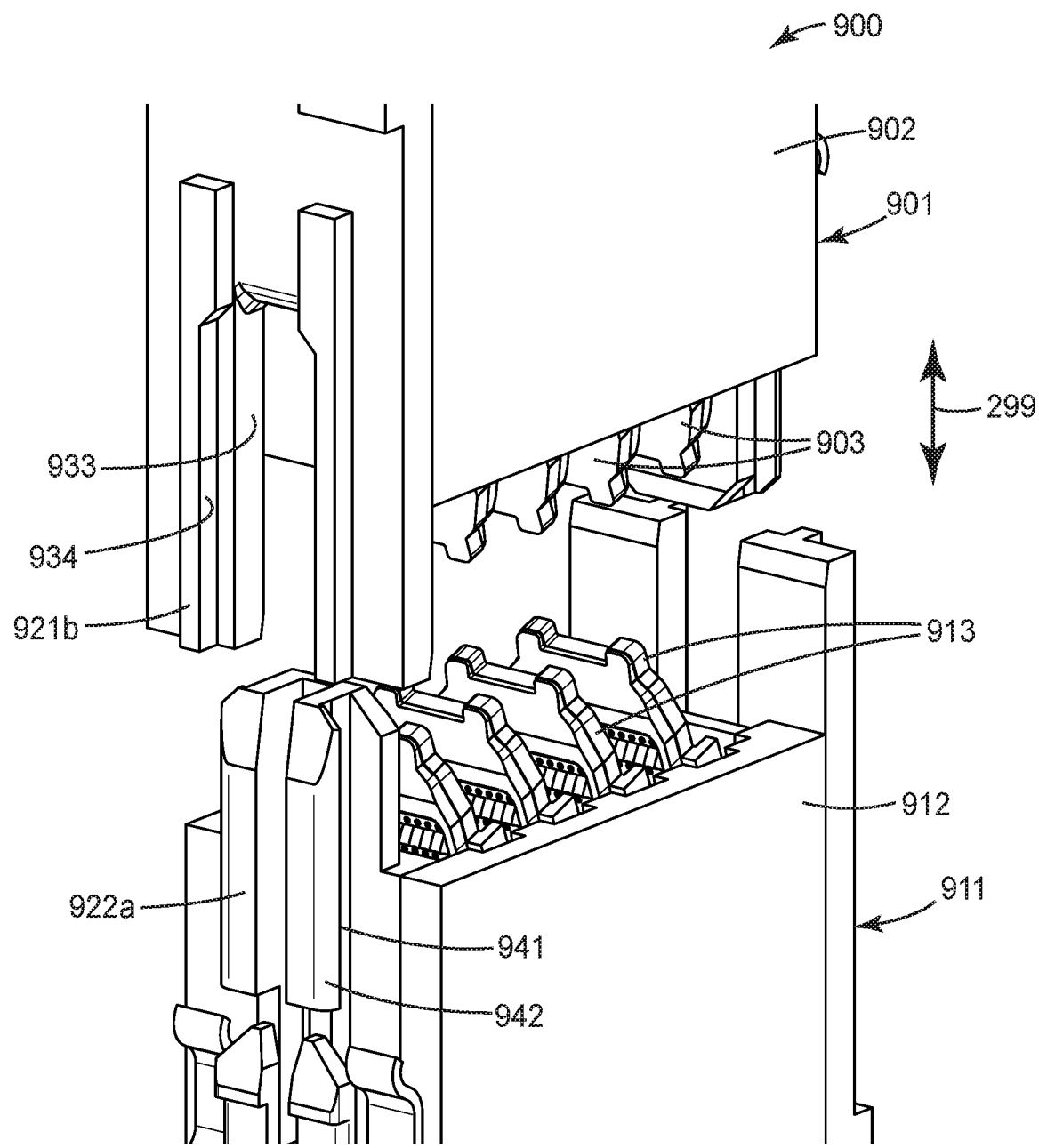
FIGS. 9A through 9D provide an example of hermaphroditic alignment features suitable for use in conjunction with a latching mechanism as shown in FIGS. 2A and 2B in accordance with some embodiments.
Figure 9B:
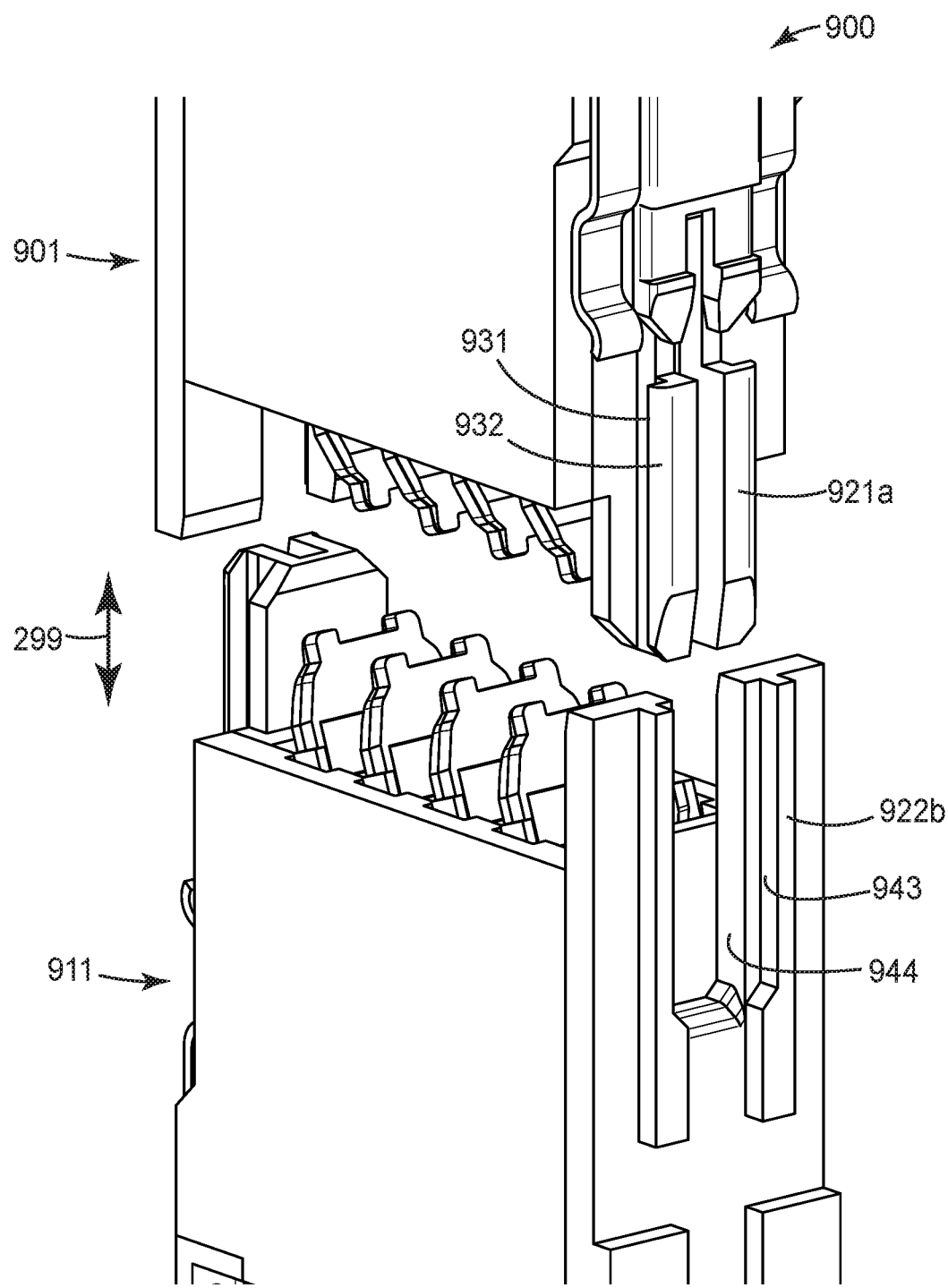
Figure 9C:
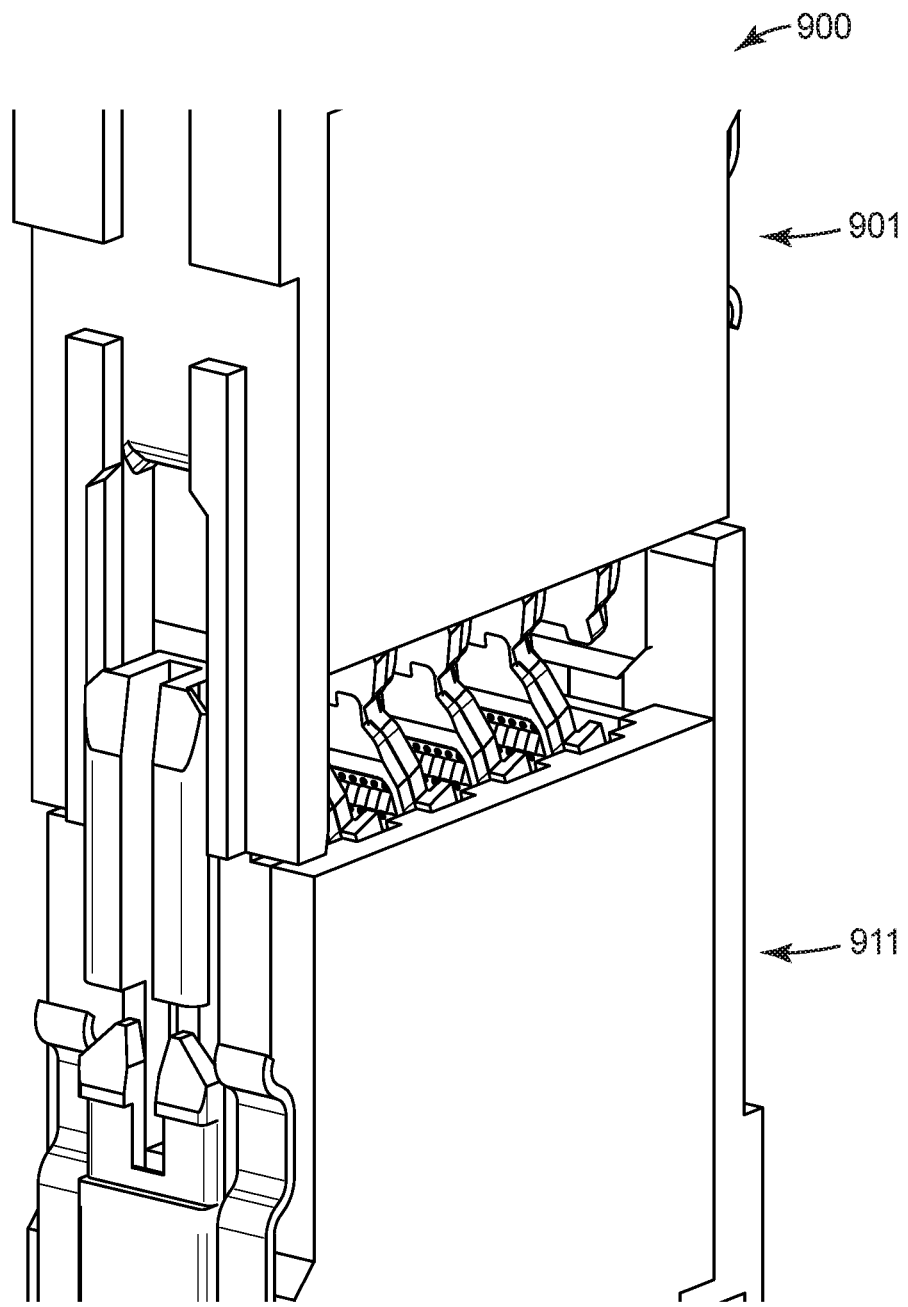
Figure 9D:
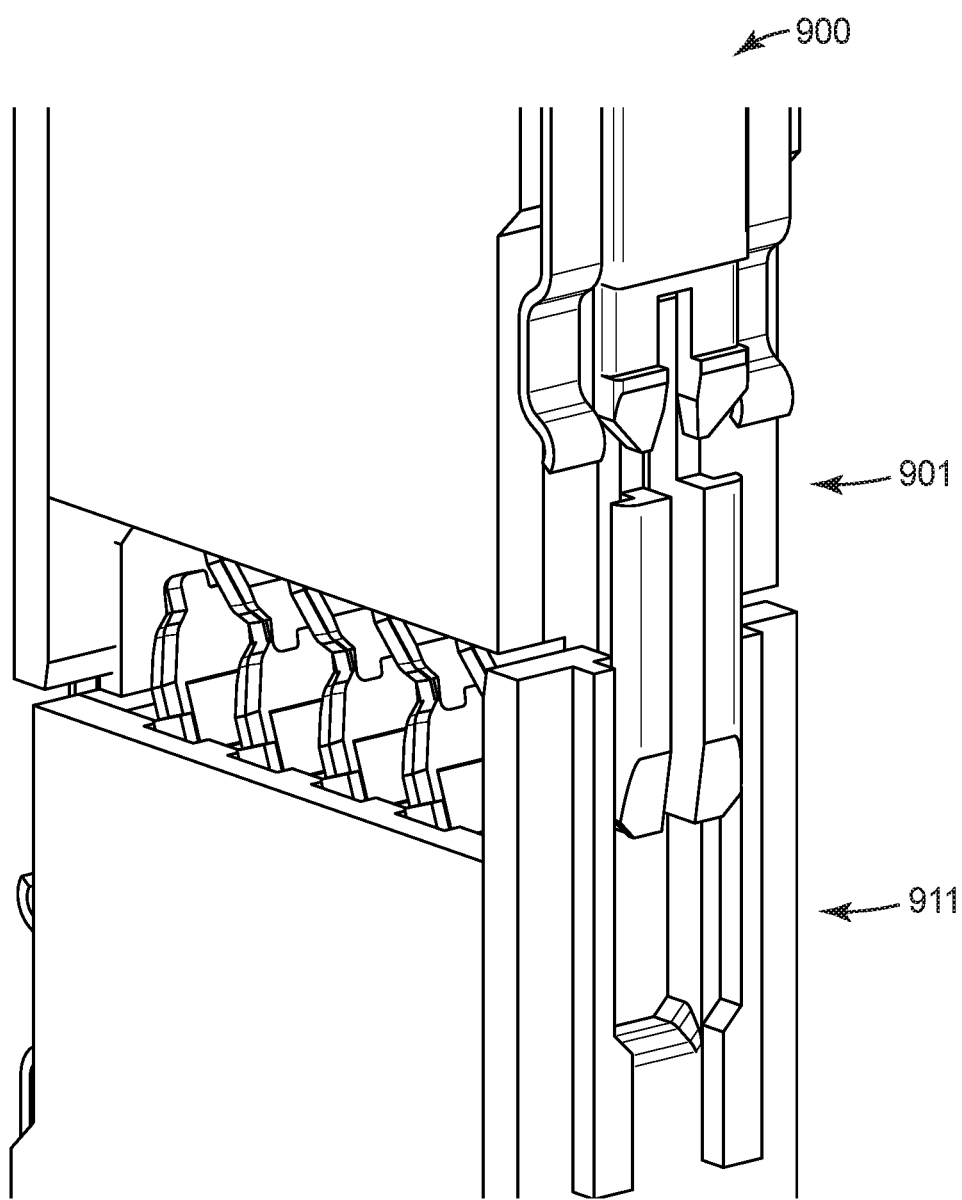

In some embodiments, the sides 931, 932 941, 942 of t-posts 921a, 922a and the sides 933, 934, 943, 944 of the t-slots 922a, 922b may be tapered such that the clearance between the t-posts 921a, 922a and t-slots 921b, 922b is larger at the mating surfaces of the connectors and the clearance between the t-posts 921a, 922a and t-slots 921b, 922b becomes progressively smaller as the t-posts 921a, 922a are inserted farther into the t-slots 922b, 921b during mating. FIGS. 9A and 9B illustrate left and right side perspective views, respectively, of the connector 901 and mating connector 911 in an initial mating position. FIGS. 9C and 9D illustrate left and right side perspective view, respectively, of the connector 901 and mating connector 911 during mating, at a position where the t-posts have been inserted about one third of the way into the t-slots. When the connectors 901, 911 are in the position shown in FIGS. 9C and 9D, the clearance between the t-posts 921a, 922a and t-slots 922b, 921b is reduced when compared to the initial mating clearance. For example, the clearances between the t-posts 921a, 922a and t-slots 922b, 921b when the connectors 901, 911 are in the position shown in FIGS. 9C and 9D may be at a minimum value. Tapering the sides 931, 932 941, 942, 933, 934, 943, 944 of the t-posts 921a, 922a and t-slots 921b, 922b in this manner enhances precision alignment, controlling five of the six degrees of freedom, e.g., translation along two of three orthogonal axes and rotation around three orthogonal axes, the sixth degree of freedom being translation along the orthogonal axis parallel to the mating axis 299.

The alignment features shown in FIGS. 9A through 9D control five degrees of freedom with compact alignment features on both sides of the connectors with good precision and reduced tendency to bind. The sixth degree (translation along the mating axis) can be controlled by the mating surfaces of the connector housing as previously described.

The latching mechanisms discussed herein can be used to securely latch and unlatch a connector pair, e.g., a hermaphroditic connector pair. Connector assemblies disclosed herein can be easily unlatched from either side of the connector assembly. In conventional connector assemblies, secure latching of hermaphroditic connectors has required an additional component to secure the hermaphroditic connectors or the unlatching requires actuation on each connector of a mating pair.

The disclosed latching mechanisms can be used with alignment features for aligning connector components. The flat nature of the t-slots and t-posts alignment features described above reduces the space to provide for precise alignment and the area of the connector housing protruding beyond the connected interface is minimized. The compact dual latching features allow for a small footprint connector capable of mating, latching, unlatching and de-mating from an identical connector. The connector having a latching mechanism and/or alignment features as described above can be plugged into and latched onto a multi-module backplane or frontplane type carrier to provide a high signal density, high signal count board to board interface.

The latching mechanisms disclosed herein are useful in conjunction with optical ferrules and optical connectors such as those described in commonly owned U.S. Patent Application 61/710,077 filed on Oct. 5, 2012 which is incorporated herein by reference in its entirety. Additional information regarding ferrules, alignment frames, and connectors that may be used in conjunction with the latching approaches described herein is provided in the following commonly owned and concurrently filed U.S. Patent Applications which are incorporated herein by reference: U.S. Patent Application Ser. No. 62/240,069, having the title "Optical Ferrules" and; U.S. Patent Application Ser. No. 62/240,066, having the title "Ferrules, Alignment Frames and Connectors," and; U.S. Patent Application Ser. No. 62/240,008, having the title "Optical Cable Assembly with Retainer,"; U.S. Patent Application Ser. No. 62/240,010, having the title "Optical Coupling Device with Waveguide Assisted Registration,"; U.S. Patent Application 62/239,996, having the title "Optical Ferrules and Optical Ferrule Molds,"; U.S. Patent Application 62/240,002, having the title "Optical Ferrules with Waveguide Inaccessible Space,"; U.S. Patent Application 62/104,196, having the title "Configurable Modular Connectors,"; and U.S. Patent Application 62/240,005, having the title "Hybrid Connectors".

Items described in this disclosure include:

Item 1. A device comprising:
a hermaphroditic connector configured to mate with a mating hermaphroditic connector, the connector having a latching mechanism configured to mechanically unlatch the connector and the mating connector, the latching mechanism of the connector, when actuated to unlatch the connector and the mating connector, disengaging both a retention feature of the connector and a retention feature of the mating connector.

Item 2. The device of item 1, wherein the connector is an electrical connector.

Item 3. The device of item 1, wherein the connector is an optical connector.

Item 4. The device of item 1, wherein the connector connects both electrical and optical paths.

Item 5. The device of and of items 1 through 4, wherein the latching mechanism includes first and second arms that move in opposite directions to disengage the retention mechanisms of the connector and the mating connector.

Item 6. The device of item 5, wherein the latching mechanism includes a pivot arm connected to the first and second arms, wherein rotation of the pivot arm about a fulcrum causes the first and second arms to move in opposite directions.

Item 7. The device of item 6, wherein the latching mechanism includes a lever coupled to the pivot arm such that a force applied to the lever rotates the lever and causes the pivot arm to rotate about the fulcrum.

Item 8. The device of item 7, wherein the retention feature of the connector comprises a latch configured to engage with one or more catches of a mating connector and the retention feature of the mating connector includes a latch configured to engage with one or more catches of the connector.

Item 9. The device of item 8, wherein the latching mechanism includes a first disengagement feature configured to disengage the latch of the connector from the catches of the mating connector and a second disengagement feature configured to disengage the latch of the mating connector from the catches of the connector.

Item 10. The device of item 9, wherein the first disengagement feature comprises a cam disposed at an end of the second arm and the second disengagement feature comprises dual cams disposed at an end of the first arm.

Item 11. The device of any of items 1 through 11, wherein the connector includes alignment features configured to engage with complementary alignment features of the mating connector.

Item 12. The device of item 11, wherein the alignment features comprise a T-pin on the first side of the connector and a T-slot on the second side of the connector.

Item 13. The device of item 12, wherein sides of at least one of the T-pin and the T-slot are tapered.

Item 14: A connector having a latching mechanism comprising:
a first retention feature arranged at a first side of the connector;
a second retention feature arranged at a second side of the connector;
a first disengagement feature configured to disengage the second retention feature of the connector from a first retention feature of a mating connector;
a second disengagement feature configured to disengage a second retention feature of the mating connector from the first retention feature of the connector; and
an actuator mechanism configured to cause movement of the first and second disengagement features to cause disengagement of the second retention features from the first retention features.

Item 15. The connector of item 14, wherein the first retention features comprises one or more catches.

Item 16. The connector of any of items 14 through 15, wherein the second retention feature comprises one or more latches.

Item 17. The connector of any of claims 14 through 16, wherein the first disengagement feature comprises at least one cam.

Item 18. The connector of any of items 14 through 17, wherein the second disengagement feature comprises one or more cams.

Item 19. The connector of any of items 14 through 18, wherein the actuator mechanism comprises moveable first and second arms operated by a lever the actuator mechanism configured to cause movement of the first and second disengagement features.

Item 20. A connector having a latching mechanism, the latching mechanism comprising:
 a retention feature disposed on a first side of the connector;
 a complementary retention feature disposed on a second side of the connector opposite the first side, the retention feature of the connector configured to engage a complementary retention feature of a mating connector and the complementary retention feature of the connector configured to engage a retention feature of the mating connector;
 an actuating lever having a first end and a second end;
 a first arm disposed along the first side of the connector, the first arm having a first end and a second end and one or more cams disposed at the second end of the first arm;
 a linkage attaching the first end of the first arm to the second end of the actuating lever;
 a second arm disposed along the second side of the connector, the second arm having a first end and a second end and at least one cam disposed at the second end of the second arm;
 a pivot arm rigidly attached to the second end of the actuating lever and attached to the first end of the second arm by a hinge; and
 wherein actuation of the lever causes rotation of the first end of the lever around the second end of the lever, the rotation of the first end of the lever causes the pivot arm to rotate around a fulcrum, rotation of the pivot arm around the fulcrum causes the first arm and the second arm to move in opposite directions along the first and second sides of the connector, respectively, motion of the first arm causes the cams at the second end of the first arm to disengage the retention feature of the connector from the complementary retention feature of the mating connector, motion of the second arm causes the cam at the second end of the second arm to disengage the complementary retention feature of the connector from the retention feature of the mating connector.

Item 21. The connector of item 20, wherein:
 the retention feature comprises one or more catches; and
 the complementary retention feature comprises one or more latches.

Item 22. The connector of any of items 20 through 21, wherein the retention feature is a dual catch and the complementary retention feature is a single latch.

Item 23. The connector of any of items 20 through 22, wherein the linkage comprises a first hinge joint attached to the lever and a second hinge joint attached to the first end of the first arm.

Item 24. The connector of any of items 20 through 23, wherein the linkage comprises a first hinge joint attached to the lever and a bendable blade attached to the first end of the first arm.

Item 25. The connector of any of items 20 through 24, wherein the one or more cams disposed at the second end of the first arm are dual cams and the at least one cam disposed at the second end of the second arm is a single cam.

Item 26. The connector of any of items 20 through 25, wherein:
 the first arm comprises two sub-arms; and
 the one or more cams comprises two cams arranged so that one cam is disposed at the second end of each of the sub-arms.

Item 27. The connector of any of items 20 through 26, further comprising alignment features configured to engage with complementary alignment features of the mating connector.

Item 28. The connector of item 27, wherein the alignment features comprise a T-pin on the first side of the connector and a T-slot on the second side of the connector.

Item 29. The connector of item 28, wherein sides of at least one of the T-pin and the T-slot are tapered.

Item 30. A method of unlatching a connector from a mating connector, comprising:
 operating an actuating lever coupled to a pivot arm and to first and second side arms;
 translationally moving the first and second side arms in opposite directions in response to operating the actuating lever;
 disengaging a second retention feature of the connector from a first retention feature of a mating connector in response to movement of the second side arm; and
 disengaging a second retention feature of the mating connector from a first retention feature of the connector in response to movement of the first side arm.

Item 31. The method of item 30, wherein:
 disengaging the second retention feature of the connector from the first retention feature of the mating connector comprises disengaging a latch of the connector from a catch of the mating connector; and
 disengaging the second retention feature of the mating connector from the first retention feature of the connector comprises disengaging a latch of the mating connector from a catch of the connector.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A device comprising:
 a hermaphroditic connector configured to mate with a mating hermaphroditic connector, the connector comprising a latching mechanism configured to mechanically unlatch the connector and the mating connector, and an actuator mechanism comprising movable first and second arms attached to a pivot arm which is operated by a lever of the actuator mechanism configured to cause the latching mechanism to disengage a retention feature from a corresponding retention feature of the mating connector by rotating the pivot arm so as to translationally move the first and second arms in opposite directions in response to operating the lever.

2. The device of claim 1, wherein the latching mechanism further comprises a disengagement feature configured to disengage the retention feature of the connector from the corresponding retention feature of the mating connector.

3. The device of claim 1, wherein the connector connects both electrical and optical paths.

4. The device of claim 1, wherein the connector includes alignment features configured to engage with complementary alignment features of the mating connector.

5. The device of claim 4, wherein the alignment features comprise a T-pin on the first side of the connector and a T-slot on the second side of the connector.

6. A method of unlatching a connector from a mating connector, comprising:

operating an actuating lever coupled to a pivot arm attached to a first retention feature and a second retention feature of the connector;

translationally moving the first and second retention features in opposite directions in response to operating the actuating lever and causing the pivot arm to rotate around a fulcrum;

disengaging the second retention feature of the connector from a first retention feature of a mating connector in response to movement of the second retention feature; and disengaging a second retention feature of the mating connector from the first retention feature of the connector in response to movement of the first retention feature.

7. The method of claim 6, wherein the first retention feature comprises one or more catches, and wherein the second retention feature comprises one or more latches.

8. The method of claim 6, wherein moving the first and second retention features is achieved by moving first and second disengagement features coupled to the first and second retention features, respectively.

9. The method of claim 8, wherein the actuating lever comprises moveable first and second arms coupled to and configured to cause movement of the first and second disengagement features.

* * * * *